US009489269B2

(12) United States Patent
Chan et al.

(10) Patent No.: US 9,489,269 B2
(45) Date of Patent: Nov. 8, 2016

(54) GLOBAL BACKUP LOCK MANAGER

(71) Applicant: Oracle International Corporation, Redwood Shores, CA (US)

(72) Inventors: Wilson Wai Shun Chan, San Mateo, CA (US); Angelo Pruscino, Los Altos, CA (US); Tak Fung Wang, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 241 days.

(21) Appl. No.: 14/292,828

(22) Filed: May 31, 2014

(65) Prior Publication Data

US 2015/0347239 A1    Dec. 3, 2015

(51) Int. Cl.
*G06F 17/30*  (2006.01)
*G06F 11/14*  (2006.01)
*G06F 11/20*  (2006.01)

(52) U.S. Cl.
CPC ........... *G06F 11/1461* (2013.01); *G06F 17/30* (2013.01); *G06F 11/2023* (2013.01); *G06F 11/2046* (2013.01); *G06F 2201/80* (2013.01); *G06F 2201/825* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,697,901 B1* | 2/2004 | Shun Chan | ............... | G06F 9/52 710/200 |
| 7,464,378 B1* | 12/2008 | Limaye | ................. | G06F 9/5061 714/100 |
| 8,296,599 B1* | 10/2012 | Boyer | ................... | G06F 11/203 714/4.11 |
| 2007/0043728 A1* | 2/2007 | Chan | ................... | G06F 11/2033 |
| 2008/0071997 A1* | 3/2008 | Loaiza | ................... | G06F 9/526 711/154 |

* cited by examiner

*Primary Examiner* — Etienne Leroux
(74) *Attorney, Agent, or Firm* — Hickman Palermo Becker Bingham LLP; Daniel D. Ledesma (57) ABSTRACT

Techniques for mastering resources in a cluster of nodes are provided. A global backup lock manager (GBLM) is maintained for a cluster of nodes that implement distributed lock management. Before a server instance is taken down, for example, for maintenance purposes, such as installing a new version of the server instance code, the mastership information that the server instance stores is reflected in the mastership information maintained by the GBLM. Thus, shutting down the server instance does not involve remastering the resources mastered by the server instance. As a result, shutting down the server instance may take minimal time.

24 Claims, 3 Drawing Sheets

GLOBAL BACKUP LOCK MANAGER

FIELD OF THE DISCLOSURE

The present disclosure relates to maintaining a global backup lock manager in a cluster environment that implements distributed lock management in order to address the unavailability of a server instance in the cluster.

BACKGROUND

A database cluster is a cluster of nodes that have access to data stored in a database. The database may reside on a single storage device or on multiple storage devices. Each node in the cluster executes one or more instances of a database server (referred to herein as a server instance.) Each server instance is configured to respond to user or application requests for data that is stored in the database.

Concurrency Control

Because each server instance has access to the same data, a concurrency mechanism needs to be implemented to ensure that two server instances are not modifying the same data at the same time. One concurrency mechanism is lock management. In a database cluster, lock management is distributed among each server instance in the cluster. Each server instance is responsible for managing locks to a particular set of data in the database. A server instance is said to be the "master" of the set of data for which the server instance is responsible with respect to lock management. Thus, each server instance is a master for a different set of resources in the database.

In the case where a server instance becomes unavailable for whatever reason, information about the set of resources for which the server instance masters is transferred to one or more other server instances in the cluster. Transferring such mastership information involves each remaining server instance identifying which remaining server instances will be the new masters of the set of resources, transferring lock information (if applicable) to the new masters, and the new masters storing the lock information it receives from other cluster nodes. In this way, concurrency control is maintained for the set of resources.

Reconfiguration

After a server instance is shut down, a reconfiguration process is performed for the other (i.e., surviving) instances in the cluster. Reconfiguration may involve deleting and establishing communication channels, cleaning up or allocating new resources/state objects, and exchanging existing/new information among the server instances. Reconfiguration can be a time-intensive and resource-intensive process, which reduces the availability of the cluster.

Specifically, when a server instance is shutdown, all resources it previously mastered must be assigned to a new master and the mastership information must be rebuilt on the new master. Rebuilding involves lock holders sending their respective lock information to the new master instance. For example, if each of four server instances master 50 million resources and one server instance is taken offline at a time, then each surviving instance might need to replay ⅓ of the mastership information of the 50 million resources. Time is spent on messaging and processing of a significant number of replay messages in order to build up the lock information on the new master.

Because the distributed lock manager distributes resource information among all the instances in the cluster, any shutdown of server instances will require rebuild or replay of mastership information. Depending on the size of the system (particular the size of the memory/buffer cache), reconfiguration can take up to minutes which may not be acceptable to some customers' service-level agreement (SLA) limits.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for reconfiguring a cluster of nodes when one or more server instances become unavailable. Each node in the cluster executes (or runs) one or more server instances. Each server instance executes (or runs) a distributed lock manager (DLM) that communicates with other server instances to provide distributed lock management over resources stored in a database to which the cluster of nodes have access. When a server instance is shut down, a global backup lock manager (GBLM) is used to provide lock management at least for the resources over which the downed server instance was mastering at (or shortly prior to) shutdown. The shutdown may be unplanned or planned, such as for maintenance of one or more server instances in the cluster. In this way, rebuilding of the mastership information from the downed server instance to another (surviving) instance may be avoided altogether.

Example Database System

Figure 1:
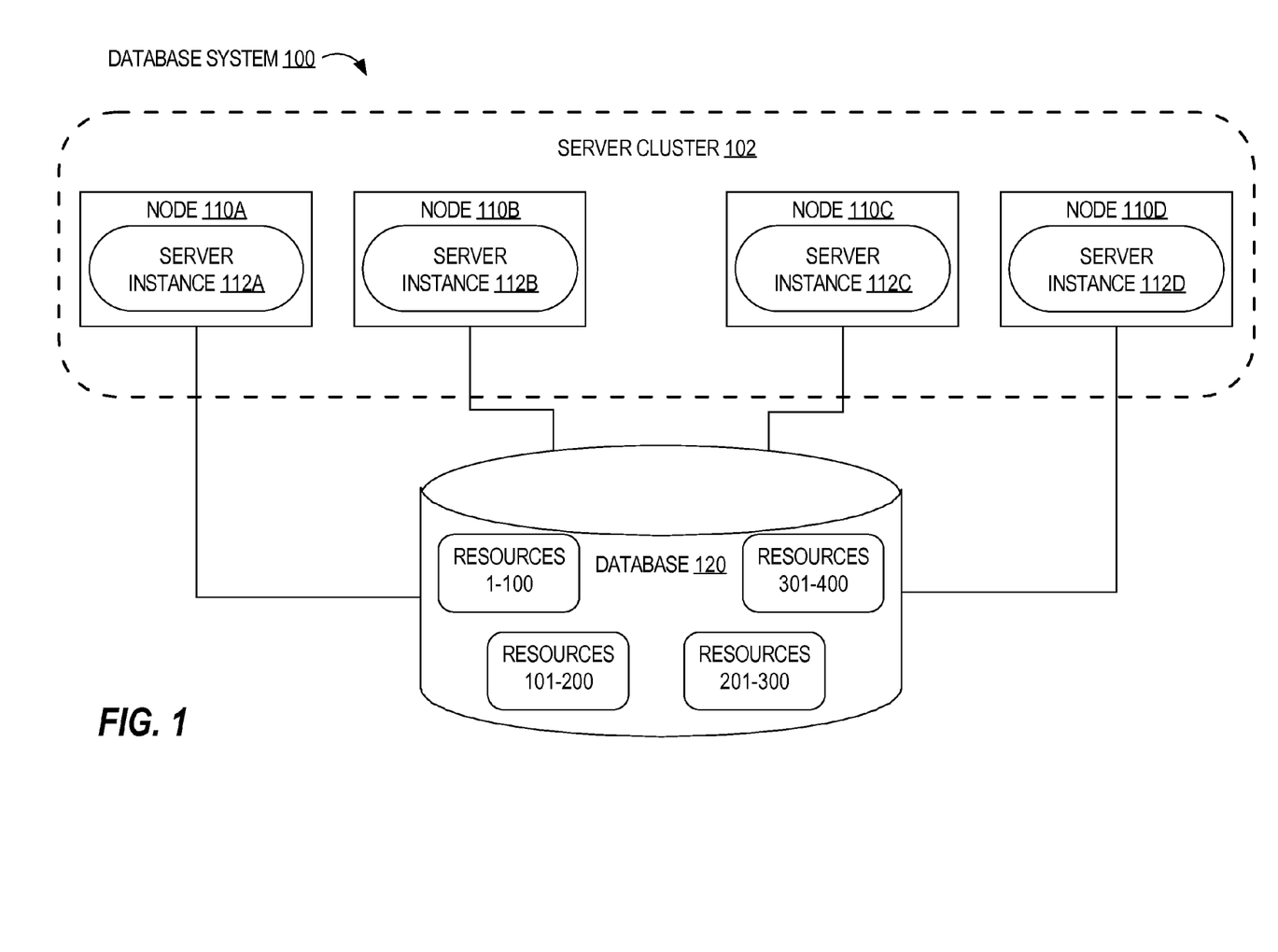
FIG. 1 is a block diagram that depicts an example database system, in an embodiment.

FIG. 1 is a block diagram that depicts an example database system 100, in an embodiment. Database system 100 includes a server cluster 102 and a database 120 that includes four sets of resources: resources 1-100, resources 101-200, resources 201-300, and resources 301-400. An example of a resource is one or more data blocks, each of which contains data, such as one or more rows or records of a table. Server cluster 102 includes four nodes: nodes 110A-110D. Although four nodes are depicted, server cluster 102 may include two, three, or five or more nodes.

Each node 110 runs or executes a server instance 112. While only one server instance is depicted in each node 110, a node 110 may include multiple server instances.

Each node 110 includes one or more processors and memory, such as volatile and/or non-volatile memory. Each server instance 112 is implemented in hardware, software, or a combination of hardware and software. Each server instance 112 is configured to respond to client requests for performing one or more database operations, such as a read or query operation and a write operation. The client requests may conform to a particular query language, such as SQL. Each server instance 112 translates client requests into database operations that a storage device that stores database 120 recognizes or is configured to process.

Each node 110 is connected to database 120, which allows each server instance 112 to send requests for data stored in database 120, receive the data, and process the data. Because each server instance 112 has access to the same set of resources in database 120, concurrency control needs to be implemented in order to ensure that, for example, two or more server instances are not modifying (e.g., updating and/or deleting) the same resource at the same time.

Thus, in an embodiment, each server instance 112 is assigned a different set of resources to master. A "master" of a resource is a server instance that maintains lock information for the resource, receives lock requests for the resource, and is the grantor of locks on the resource. The master is responsible for ensuring that no two server instances have conflicting locks on the same resource. For example, while multiple server instances 112 may have a shared lock on resource 34, server instance 112D requests an exclusive lock that is incompatible with the share locks. Server instance 112D will have to wait until the shared locks are released before the master of resource 34 (e.g., server instance 112A) grants the exclusive lock on resource 34 to server instance 112D Although not depicted in FIG. 1, each node 110 is connected to each other node 110 to allow server instances 112A-112D to communicate with each other in order to ensure concurrency control.

Global Backup Lock Manager

Figure 2:
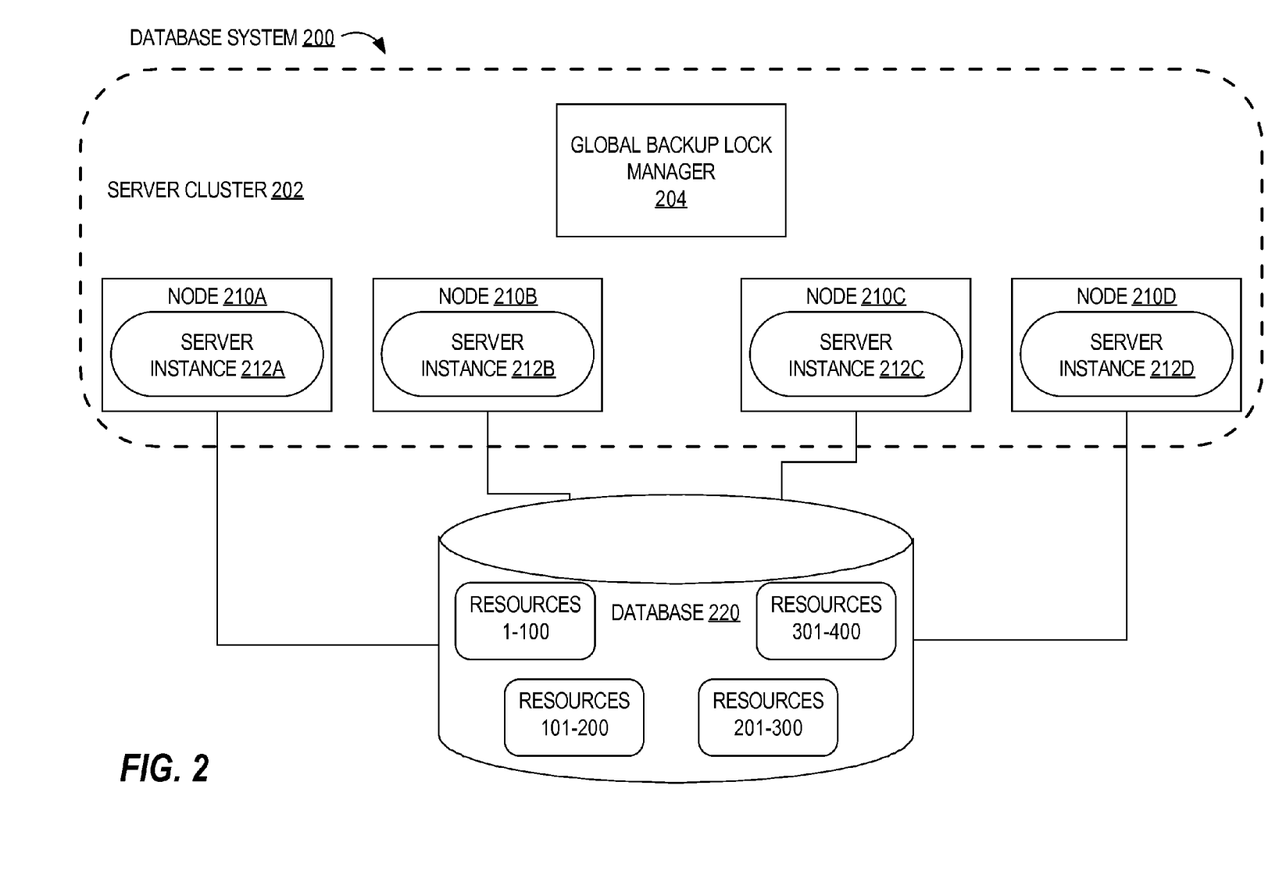
FIG. 2 is a block diagram that depicts an example database system, in an embodiment.

FIG. 2 is a block diagram that depicts an example database system 200, in an embodiment. Database system 200 is similar to database system 100 that is depicted in FIG. 1. For example, database system 200 includes a server cluster 202 and a database 220. However, server cluster 202 is different than server cluster 102 at least in that server cluster 202 includes a global backup lock manager (GBLM) 204.

GBLM 204 may be implemented in hardware, software, or a combination of hardware or software. GBLM 204 may be implemented on multiple computing devices or a single computing device, which may be different than any of nodes 210A-210D. Alternatively, GBLM 204 may be implemented on one of nodes 210A-D. Each server instance 212 is communicatively coupled to GBLM 204. However, GBLM 204 does not need to be connected to database 220 because GBLM 204 does not need to access any data in database 220.

GBLM 204 serves as a backup lock manager for server instances 212A-212D in server cluster 202 while server instances 212A-212D are offline (or otherwise unavailable to client requests). GBLM 204 stores (or has access to) a copy of mastership lock information that each server instance 212 maintains. Thus, if server instance 212A masters resources 1-100 and server instance 212B masters resources 101-200, then GBLM 204 also stores master lock information for resources 1-200.

Mastership information indicates, for each resource of one or more resources that are mastered by the master and that are currently locked, a type of lock that is held on the resource and, optionally, which server instance holds the lock. The mastership information may indicate for at least one resource that multiple compatible (e.g., shared) locks are held on the resource. Mastership information may also indicate which server instances have pending lock requests that have not yet been granted.

Therefore, GBLM 204 allows server cluster 202 to remain operational in case one of server instances 212 becomes unavailable for whatever reason. GBLM 204 is particularly useful when one or more maintenance operations need to be performed. For example, one or more (or all of) server instances 212 may require an upgrade to a new version, a downgrade to a previous version, or some other software patch or update. Whatever the maintenance operation(s) that are to be performed, one or more server instances will need to restart or the corresponding node 210 will need to restart. In either restart scenario, one or more server instances are not available for servicing client requests.

In an embodiment, software patches that any of server instances 212A-212D might need are not applied to GBLM 204. This may be so because GBLM 204 might implement code for maintaining lock information and responding to lock requests without implementing code for other database "layers", such as transaction processing, which may need frequent updates or fixes. The code for lock management may be relatively more stable than the code for other database layers.

Using GBLM Before and After a Master Goes Down

When a master is offline (whether planned or unplanned), a requestor interacts only with GBLM 204 in order to obtain a lock on a resource that was mastered by the offline master. However, in some embodiments, both a master and a GBLM 204 grant lock requests for resources of which the master masters. This may occur if GBLM 204 is kept "in sync" with a master (or all service instances in server cluster 202) continuously in case the master becomes unavailable for whatever reason.

In a related embodiment, GBLM 204 is only synchronized with a master in response to a determination that the master is planned to be shut down or otherwise become unavailable. There may be a period of time before the master goes down and/or after the master becomes available again where both the master and GBLM 204 grant locks on resources that are mastered by the master. Some of the following sections and described approaches indicate how GBLM 204 and a master may be used when the master is available and GBLM 204 is kept in sync with the master.

Processing Lock Requests Using GBLM and DLM

While GBLM 204 is operating together with server instances 212A-212D, distributed lock management (DLM) is still implemented among server instances 212A-212D. GBLM 204 may be combined with DLM in multiple ways. Thus, lock requests among server instances 212A-212D and GBLM 204 may be generated and processed using one of multiple approaches.

"2-2" Approach

One approach for processing lock requests is referred to herein as the "2-2" approach. In this approach and in each of the following approaches, the first number indicates the number of lock requests the requestor sends while the second number indicates the number of lock grant messages the requestor receives.

In the "2-2" approach, a requestor (e.g., server instance 212B) sends one lock request for a resource to the master for the resource (e.g., server instance 212A) and another lock request for the resource to GBLM 204. After sending both lock requests, the requestor waits to receive two lock grant messages: one from the master and the other from GBLM 204.

"1-2" Approach

Another approach for processing lock requests is referred to herein as the "1-2" approach. In this approach, the requestor sends a single lock request for a resource to only the master of the resource. The requestor does not send a lock request for the resource to GBLM 204. After sending the lock request to the master, the requestor receives two lock grant messages.

In one variation of the "1-2" approach, the requestor receives a lock grant message from the master and another lock grant message from GBLM 204. Before the requestor receives the lock grant message from GBLM 204, the master forwards the lock request to GBLM 204. The master may forward the lock request to GBLM 204 before the master determines that a lock may be granted on the resource or after making that determination.

In a different variation of the "1-2" approach, the requestor expects to receive two lock grant messages from the master. In this approach, after the master receives the lock request from the requestor, the master forwards the lock request to GBLM 204. In response, GBLM 204 sends a lock grant message to the master. The master forwards the lock grant message to the requestor. The master may or may not wait until it receives the lock grant message from GBLM 204 before sending its own lock grant message to the requestor.

"1-1" Approach

Another approach for processing lock requests is referred to herein as the "1-1" approach, or the "transparent GBLM" approach. In this approach, the requestor proceeds as if GBLM 204 does not exist. The requestor sends a single lock request to the master and the master sends a single lock grant message to the requestor. In between these two actions, the master forwards the lock request to GBLM 204, which eventually responds to the master with a lock grant message. The master does not send a lock grant message to the requestor until the master receives the lock grant message from GBLM 204.

Weak Grant Approach

A variation of the 1-2 approach or the 2-2 approach is where the requestor updates or reads the resource as soon as the requestor receives a lock grant message from either the master or GBLM 204 but before the requestor receives both lock grant messages. This approach is referred to as the "weak grant" approach. The lock grant represented by the first lock grant message that the requestor receives is considered a "weak" grant. A "weak" grant is made "strong" if or when the requestor receives the second lock grant message for the resource. However, the requestor does not commit the transaction that uses the resource until the requestor has received the second lock grant message. This approach has the advantage that the requestor may proceed with executing a transaction that requires the resource before the second lock grant message is received for the resource.

Requestor is the Master

In some scenarios, the requestor is the master. For example, server instance 212A masters resources 1-100 and requires a lock on resource 3. In an embodiment, the requestor/master grants itself a lock when the lock is available and sends a lock request to GBLM 204. The lock request may be sent to GBLM 204 before, after, or simultaneously with the granting of the lock. The requestor/master may begin processing resource 3 as soon as it grants itself the lock but does not commit the corresponding transaction until the requestor/master receives, from GBLM 204, a lock grant message for the resource, as in the weak grant approach

Synchronizing the GBLM with the DLM

GBLM 204 is considered "synchronized" with server cluster 202 if GBLM 204 has access to a copy of the mastership information that each node 210 stores. Even though a master of a resource has received a lock request from a requestor and granted a lock to the requestor before GBLM 204 has granted a lock to the requestor (e.g., in the case of a weak grant), GBLM 204 is still considered to be "synchronized" with server cluster 202.

In an embodiment, as noted previously, GBLM 204 is synchronized with each server instance in the cluster before a planned shutdown is known or anticipated. For example, GBLM 204 may be operating concurrently with each server instance 212 since each server instance 212 has started up.

In an alternative embodiment, as noted previously, GBLM 204 is not synchronized with any server instance 212 until a scheduled downtime is known or anticipated. For example, mastership information from one or more cluster nodes is transferred to GBLM 204 in response to one or more server instances 212 receiving a notification or instruction that a brownout is about to occur, such as in the next two or ten minutes.

If GBLM 204 is not synchronized with a master (e.g., server instance 212A), then, eventually, the master sends its mastership information to GBLM 204. While the master is sending its mastership information and GBLM 204 is receiving and processing the mastership information, a requestor may send a lock request to the master (and, optionally, to GBLM). In an embodiment, after GBLM 204 is completely in sync with each server instance, GBLM 204 sends a message to each server instance notifying each server instance that GBLM 204 is synchronized and is ready to receive lock requests from masters and, optionally, requestors.

In case of the "2-2" approach, the master may wait until all its mastership information has been transferred to GBLM 204 before sending the lock request to GBLM 204. Alternatively, without waiting, the master may send the lock request to GBLM 204 immediately. In that case, GBLM 204 may wait to process the lock request until GBLM 204 has received and processed, from the master, all the mastership information maintained by the master. Each lock request may be associated with timestamp or other sequential information to allow GBLM 204 to know an order in which to process the mastership information it receives.

In case of the "1-1" approach or the "1-2" approach, a master (e.g., server instance 212A) waits until it sends all its mastership information to GBLM 204 before sending a lock request (from a requestor) to GBLM 204. Alternatively, the master sends its mastership information and the lock request simultaneously or in any order. In that case, GBLM 204 uses timestamp or sequential information to determine an order in which to process the mastership information and the lock request.

In an embodiment, in response to determining that a master is about to go offline, the master sends mastership information to GBLM 204. While the mastership information is sent to GBLM 204, all lock requests for resources mastered by the master are sent to the master. Eventually, the master sends a notification to each other server instance to send future lock requests to GBLM 204 instead of to the master. After that point and until notified that the master is back online, all lock requests for resources mastered by the master are sent to GBLM 204. The master may send, to GBLM 204, a "complete" or "done" message that indicates that the master has no more mastership information to send to GBLM 204. GBLM 204 may use that "done" message to determine when GBLM 204 can begin processing requests received from requestors for locks on resources mastered by the master.

Shutdown Detection

Each server instance 212 is configured to know when another service instance 212 is offline. Thus, a requestor is configured to send lock requests to GBLM 204 instead of to the master that is currently offline. A server instance 212 detects when another service instance 212 is offline or unavailable in one of multiple ways.

For example, each server instance 212 sends an "alive" message to each other server instance 212 on a regular basis, such as every second. If server instance 212A does not receive an "alive" message from server instance 212B for a certain period of time (e.g., three seconds), then server instance 212A presumes that server instances 212B is offline or otherwise unavailable.

As another example, server instance 212A may notify each other server instance 212 in server cluster 202 with a "down" message that indicates that server instance 212A is about to go offline. After receiving that message, each other server instance 212 that requires a lock on a resource that is mastered by server instance 212A sends a lock request only to GBLM 204 instead of to server instance 212A.

In a related embodiment, instead of server instances 212 communicating directly with each other, a different process on each node 210 in server cluster 202 is configured to send "alive" messages and/or "down" messages to each other. Each of these different processes then communicates with the service instance that executes on the same node 210.

In a related embodiment, one or more nodes or server instances in server cluster 202 are configured to receive a "shutdown" message from a computing device (e.g., operated by a database administrator) that is outside of server cluster 202. The "shutdown" message may be directed to each server instance 212 or to a single server instance (e.g., server instance 212A), which will go offline first (and have one or more maintenance operations performed thereon) and then will be responsible for instructing another server instance in server cluster 202 to go offline. Alternatively, instead of each server instance instructing the next server instance to go offline for one or more maintenance operations (i.e., in a "rolling" fashion), after a first server instance goes offline for one or more maintenance operations, the first server instance notifies the computing device that instructed the first server instance to go offline that the first server instance is now online or is otherwise available. The computing device, in this scenario, then instructs a second server instance to go offline for one or more maintenance operations. This process repeats until all (or some) server instances have been shut down.

Coming Back Online

After one or more server instances are offline (e.g., due to scheduled maintenance), those server instances become available again. For example, server instance 212A was offline and then sends an "alive" message to each other server instance 212. As another example, each other server instance 212 periodically sends ping messages to server instance 212A. When a server instance 212A responds to a ping message, the server instances that sent the ping message determines that server instance 212A is again available.

GBLM 204 may detect that a master is again available through a similar (e.g., an "alive") message from the master. In response to detecting that a master is back online, GBLM 204 sends, to the master, mastership information that pertains to resources that were mastered by the master just prior to the master being shut down. However, the mastership information that GBLM 204 sends reflects the current state of locks with respect to those resources.

In response to determining that a master is back online, a requestor is configured to send lock requests to the master (if the lock request pertains to resources that are mastered by the master). Before processing a lock request from a requestor, the master may wait until the master has received or processed all the mastership information from GBLM 204. GBLM 204 may send a "sync" message after GBLM 204 has sent all the mastership information for the master to the master. After that point, the master may respond to the lock request.

In an embodiment, a master that comes back online may first send an "alive" message to GBLM 204 without notifying any of the other server instances 212. GBLM 204 then sends, to the master, mastership information about resources that are mastered by the master. Eventually, GBLM 204 notifies the master that the master is synced with GBLM 204. Then, the master (or GBLM 204) notifies the other service instances 212 that the master is back online.

A requestor may follow one of the two approaches described previously that involve the requestor interacting in some way with GBLM 204 (such as the "1-2" approach or the "2-2" approach). Alternatively, the requestor may not interact directly with GBLM 204 anymore while the master is back online. For example, the requestor and the master may implement the "1-1" approach once the master is back online. As another example, neither the master nor the requestor interacts with GBLM 204 at all. In this scenario, GBLM 204 does not remain synchronized with respect to the master that has come back online. However, GBLM 204 may be synchronized with one or more other server instances 212, in server cluster 202, that have not yet been taken offline, for example, for a scheduled shutdown.

For example, GBLM 204 may remain synchronized with each server instance 212 in server cluster 202 throughout a rolling brownout period (i.e., where one or more server instances 212 are taken offline at a time). Alternatively, GBLM 204 is only synchronized with one or more server instances 212 that are about to be taken offline. GBLM 204 is not synchronized for server instances 212 that have already come back online or for server instances 212 that are not about to be taken offline.

For example, after server instance 212A has come back online after one or more maintenance operations have been performed with respect to server instance 212A, GBLM 204 no longer maintains mastership information for server instance 212A. However, GBLM 204 becomes synchronized with server instance 212B before server instance 212B is taken offline for scheduled maintenance. Server instances 212C and 212D will not be taken offline for scheduled maintenance until after server instance 212B is brought back online after a successful maintenance operation (e.g., a software patch or update has been installed). GBLM 204 is also not synchronized with server instances 212C and 212D while server instance 212B is offline. Before server instance 212C is taken offline, however, GBLM 204 will become synchronized with server instance 212C.

While this example indicates only one server instance is taken offline at a time, in other embodiments, multiple server instances are offline at a particular time. For example, server instances 212A-212C may be taken offline simultaneously to allow one or more maintenance operations to be performed on each of server instances 212A-212C, while server instance 212D remains online so that server instance 212D can service any client requests for data stored in database 220. After one or more of server instances 212A-212C come back online, server instance 212D is taken offline so that one or more maintenance operations (which may be the same or different than the maintenance operations performed on server instances 212A-212C) may be performed.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
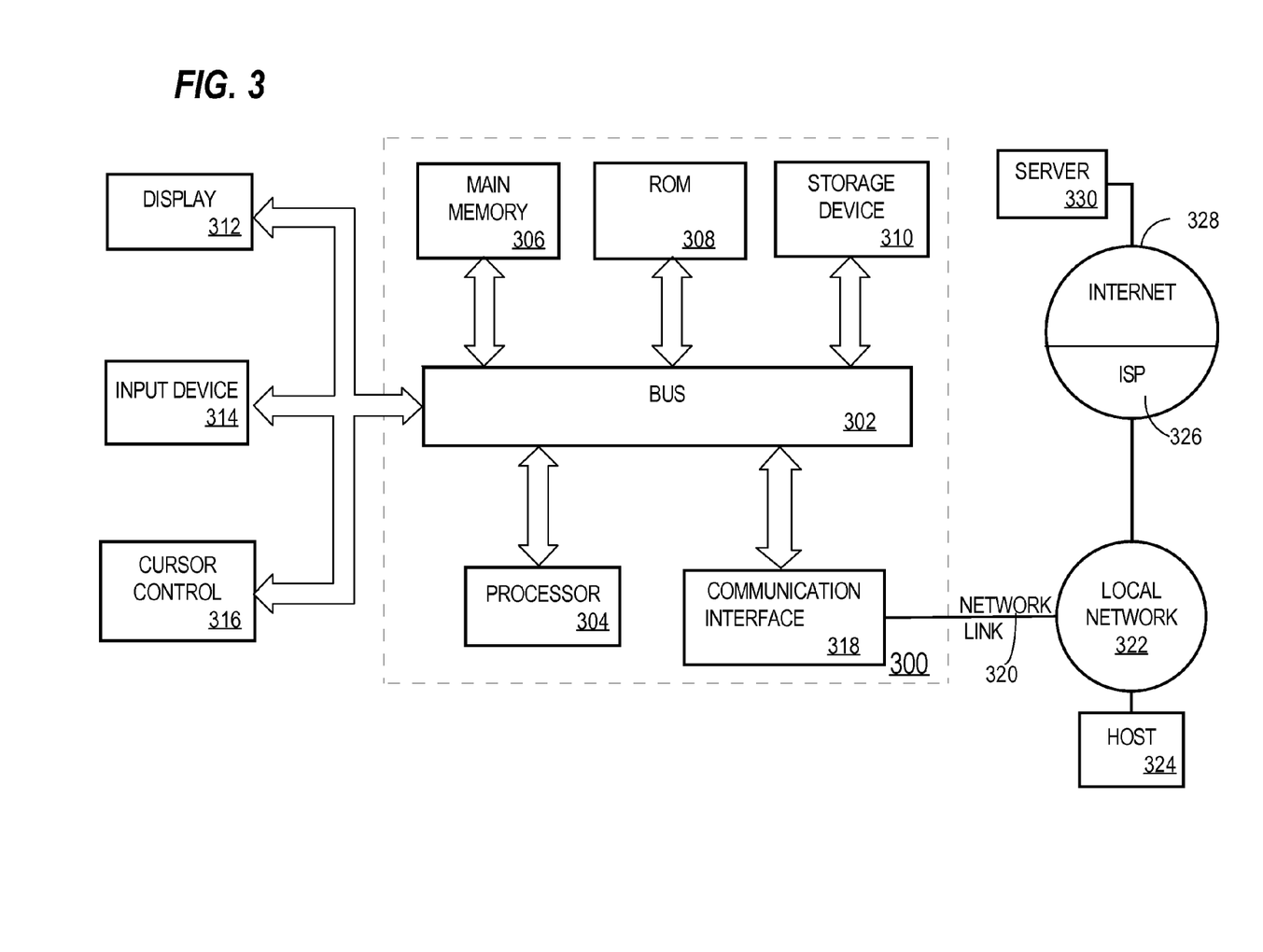
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing, on a first node in a cluster of nodes that manage a database, first mastership information for a first subset of resources that are stored in a database;
   storing, on a second node, in the cluster of nodes, second mastership information for a second subset of the resources that are stored in the database, wherein the second node is different than the first node, wherein the second subset is different than the first subset;
   while storing the first mastership information on the first node and storing the second mastership information on the second node and prior to determining that a server instance executing on the second node is unavailable, maintaining, by a backup lock manager executing on a third node, third mastership information for the second subset of the resources;
   while the backup lock manager maintains the third mastership information, sending, from a first server instance executing on the first node, to the backup lock manager, a lock request for a lock on a resource in the second subset;
   wherein the method is performed by one or more computing devices.

2. The method of claim 1, wherein the third node is different than the first node and the second node.

3. The method of claim 1, further comprising:
   after sending the lock request, determining that the second server instance is available;
   after determining that the second server instance is available, sending, from the first server instance executing on the first node, to the second server instance executing on the second node, a second lock request for a second lock on the resource in the second subset.

4. The method of claim 1, further comprising:
   receiving a request to perform one or more maintenance operations on each node of multiple nodes in the cluster of nodes;
   in response to receiving the request:
      causing the second server instance executing on the second node to become unavailable;
      causing the one or more maintenance operations to be performed on the second node;
      after the one or more maintenance operations are performed on the second
         node, causing the second server instance executing on the second node to become available and causing the first node to become unavailable.

5. The method of claim 4, further comprising:
   while the first node is unavailable, the backup lock manager receiving lock requests for resources in the first subset of resources.

6. The method of claim 1, wherein:
   while the first node is available and while the second node is unavailable, the first node receiving lock requests for resources in the first subset of resources, wherein the backup lock manager does not receive any lock request for a resource in the first subset of resources while the first node is available.

7. A method comprising:
   receiving, from a requesting instance in a multi-node database server, at a master instance for a resource, a first lock request for a lock on the resource;
   receiving, at a backup lock manager that is different than the master instance, a second lock request that is for the lock on the resource and that is initiated by the requesting instance;
   wherein the backup lock manager maintains mastership information for the master instance;
   the requesting instance waiting to commit a transaction that involves the resource until both the master instance and the backup lock manager grant the lock on the resource to the requesting instance;

wherein the method is performed by one or more computing devices.

8. The method of claim 7, further comprising:

after the requesting instance receives a first lock grant message regarding the resource and prior to the requesting instance receiving a second lock grant message regarding the resource, performing, by the requesting instance, one or more operations on the resource;

waiting to commit a transaction in which the one or more operations are performed until the requesting instance receives the second lock grant message.

9. The method of claim 7, further comprising:

in response to the master instance receiving the first lock request:

sending, from the master instance, to the requesting instance, a grant message that indicates that the first lock request is granted;

sending, from the master instance, to the backup lock manager, the second lock request.

10. The method of claim 9, further comprising:

receiving, at the master instance, from the backup lock manager, grant data that indicates that the backup lock manager grants the lock on the resource;

sending, from the master instance, to the requesting instance, a second grant message that indicates that the lock is granted.

11. The method of claim 7, further comprising, sending, from the requesting instance, the second lock request to the backup lock manager, wherein receiving the second lock request comprises receiving the second lock request at the backup lock manager from the requesting instance.

12. The method of claim 7, further comprising:

receiving, at the requesting instance, a first lock grant message from the master instance;

receiving, at the requesting instance, a second lock grant message from the backup lock manager.

13. One or more non-transitory storage media storing instructions which, when executed by one or more processors, cause:

storing, on a first node in a cluster of nodes that manage a database, first mastership information for a first subset of resources that are stored in a database;

storing, on a second node, in the cluster of nodes, second mastership information for a second subset of the resources that are stored in the database, wherein the second node is different than the first node, wherein the second subset is different than the first subset;

while storing the first mastership information on the first node and storing the second mastership information on the second node and prior to determining that a server instance executing on the second node is unavailable, maintaining, by a backup lock manager executing on a third node, third mastership information for the second subset of the resources;

while the backup lock manager maintains the third mastership information, sending, from a first server instance executing on the first node, to the backup lock manager, a lock request for a lock on a resource in the second subset.

14. The one or more non-transitory storage media of claim 13, wherein the third node is different than the first node and the second node.

15. The one or more non-transitory storage media of claim 13, wherein the instructions, when executed by the one or more processors, further cause:

after sending the lock request, determining that the second server instance is available;

after determining that the second server instance is available, sending, from the first server instance executing on the first node, to the second server instance executing on the second node, a second lock request for a second lock on the resource in the second subset.

16. The one or more non-transitory storage media of claim 13, wherein the instructions, when executed by the one or more processors, further cause:

receiving a request to perform one or more maintenance operations on each node of multiple nodes in the cluster of nodes;

in response to receiving the request:

causing the second server instance executing on the second node to become unavailable;

causing the one or more maintenance operations to be performed on the second node;

after the one or more maintenance operations are performed on the second node, causing the second server instance executing on the second node to become available and causing the first node to become unavailable.

17. The one or more non-transitory storage media of claim 16, wherein the instructions, when executed by the one or more processors, further cause:

while the first node is unavailable, the backup lock manager receiving lock requests for resources in the first subset of resources.

18. The one or more non-transitory storage media of claim 13, wherein:

while the first node is available and while the second node is unavailable, the first node receiving lock requests for resources in the first subset of resources, wherein the backup lock manager does not receive any lock request for a resource in the first subset of resources while the first node is available.

19. One or more non-transitory storage media storing instructions which, when executed by one or more processors, cause:

receiving, from a requesting instance in a multi-node database server, at a master instance for a resource, a first lock request for a lock on the resource;

receiving, at a backup lock manager that is different than the master instance, a second lock request that is for the lock on the resource and that is initiated by the requesting instance;

wherein the backup lock manager maintains mastership information for the master instance;

the requesting instance waiting to commit a transaction that involves the resource until both the master instance and the backup lock manager grant the lock on the resource to the requesting instance.

20. The one or more non-transitory storage media of claim 19, wherein the instructions, when executed by the one or more processors, further cause:

after the requesting instance receives a first lock grant message regarding the resource and prior to the requesting instance receiving a second lock grant message regarding the resource, performing, by the requesting instance, one or more operations on the resource;

waiting to commit a transaction in which the one or more operations are performed until the requesting instance receives the second lock grant message.

21. The one or more non-transitory storage media of claim 19, wherein the instructions, when executed by the one or more processors, further cause:
in response to the master instance receiving the first lock request:
sending, from the master instance, to the requesting instance, a grant message that indicates that the first lock request is granted;
sending, from the master instance, to the backup lock manager, the second lock request.

22. The one or more non-transitory storage media of claim 21, wherein the instructions, when executed by the one or more processors, further cause:
receiving, at the master instance, from the backup lock manager, grant data that indicates that the backup lock manager grants the lock on the resource;
sending, from the master instance, to the requesting instance, a second grant message that indicates that the lock is granted.

23. The one or more non-transitory storage media of claim 19, wherein:
the instructions, when executed by the one or more processors, further cause sending, from the requesting instance, the second lock request to the backup lock manager;
receiving the second lock request comprises receiving the second lock request at the backup lock manager from the requesting instance.

24. The one or more non-transitory storage media of claim 19, wherein the instructions, when executed by the one or more processors, further cause:
receiving, at the requesting instance, a first lock grant message from the master instance;
receiving, at the requesting instance, a second lock grant message from the backup lock manager.

* * * * *

UNITED STATES PATENT AND TRADEMARK OFFICE
CERTIFICATE OF CORRECTION

PATENT NO. : 9,489,269 B2  
APPLICATION NO. : 14/292828  
DATED : November 8, 2016  
INVENTOR(S) : Chan et al.

Page 1 of 1

It is certified that error appears in the above-identified patent and that said Letters Patent is hereby corrected as shown below:

In the Specification

In Column 3, Line 38, after "112D" insert -- . --.

In Column 6, Line 23, after "approach" insert -- . --.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*